US009851223B2

(12) United States Patent
Choi et al.

(10) Patent No.: US 9,851,223 B2
(45) Date of Patent: Dec. 26, 2017

(54) TACTILE SENSOR (71) Applicant: Research & Business Foundation SUNGKYUNKWAN UNIVERSITY, Suwon-si (KR)

(72) Inventors: Hyouk Ryeol Choi, Gunpo-si (KR); Tien Dat Nguyen, Suwon-si (KR); Junwoo Park, Seoul (KR); Hyoseung Han, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/261,034

(22) Filed: Sep. 9, 2016

(65) Prior Publication Data
US 2017/0067757 A1    Mar. 9, 2017

(30) Foreign Application Priority Data
Sep. 9, 2015   (KR) .................. 10-2015-0127927

(51) Int. Cl.
*G01D 5/24*    (2006.01)
(52) U.S. Cl.
CPC ................. *G01D 5/2405* (2013.01)

(58) Field of Classification Search
CPC ........ G05B 23/00; G06K 19/00; A63F 13/213
See application file for complete search history.

(56) References Cited

U.S. PATENT DOCUMENTS

| 2009/0165569 A1* | 7/2009 | Taya ................ G01D 5/14 73/862.041 |
| 2010/0053608 A1* | 3/2010 | Lee ................ G06K 9/0004 356/326 |
| 2010/0176825 A1* | 7/2010 | Kim ................ G01L 5/228 324/691 |
| 2010/0307900 A1* | 12/2010 | Choi ................ H01H 13/85 200/330 |

FOREIGN PATENT DOCUMENTS

JP       2015-114308 A      6/2015

* cited by examiner

Primary Examiner — Giovanni Astacio-Oquendo
Assistant Examiner — Alvaro Fortich
(74) Attorney, Agent, or Firm — NSIP Law (57) ABSTRACT

The present disclosure relates to a tactile sensor including a first substrate on which a first electrode is formed; a second substrate on which a second electrode and a coupling hole is formed so that the first electrode may be inserted into the coupling hole; and a dielectric covering the first electrode and the second electrode, and thus not only having flexibility and elasticity, but also requiring a reduced number of wires to be used when sending and receiving signals, making it is easier to manufacture and saving costs.

7 Claims, 6 Drawing Sheets

TACTILE SENSOR

CROSS-REFERENCE TO RELATED APPLICATION

This application claims priority to and the benefit of Korean Patent Application No. 10-2015-0127927, filed on Sep. 9, 2015, in the Korean Intellectual Property office, the entire contents of which are incorporated herein by reference in their entirety.

BACKGROUND

Field

The present disclosure relates to a tactile sensor, and more particularly, to a tactile sensor that not only has flexibility and elasticity, but also requires a reduced number of wires to be used for sending and receiving signals, and is thereby easy to manufacture and saves costs.

Description of Related Art

Recently, as industrial technologies develop, there are active efforts to develop industrial robots and medical robots as tools capable of carrying out dangerous operations and detailed operations instead of human beings.

At the early stages of development, these robots were designed to perform simple operations repeatedly, but recently, there is a demand to develop intelligent robots of evolved forms equipped with the appearance, thoughts and even behaviors of human beings such as humanoids so that they can gradually perform more complicated operations.

In the case of the aforementioned intelligent robots, since it its practically impossible for designers to input all the operation programs for coping with every external situation one by one, the robots are required to recognize and determine the external environment (or stimulation) for themselves using their sensors that are similar to the sensory organs of human beings, and to behave accordingly.

One of the most important technologies related to these intelligent robots is the technology of tactile sensors or contact sensors capable of sensing the size, contacting position and the like of the external load contacting the intelligent robot.

Capacitor type sensors are one type of conventional tactile sensors. Capacitor type sensors are configured in the form of a general capacitor where a dielectric is disposed between an anode and a cathode. Thus, when the dielectric is deformed by an external stimulation, a change in capacitance occurs, and thus the external stimulation can be sensed using this change in capacitance.

However, conventional tactile sensors have limitations in reducing their thickness, and another problem is that the durability of the electrodes contacting external elements cannot be secured. Further, when sensing an external stimulation, in an automatic control, due to the electrode exposed towards outside, a disturbance may occur that can cause a change in the amount of control besides the reference input. Further, since wires are required as many as the number of cells in order to connect the anode and cathode in each cell (the minimum unit forming a group of anode and cathode) that constitutes the sensor, it is difficult and complicated to manufacture the sensor, which is a disadvantage.

Therefore, there is an emerging demand for a tactile sensor that compensates the aforementioned problems.

SUMMARY

Therefore, a purpose of the present disclosure is to solve the aforementioned problems of prior art, that is, to provide a tactile sensor having flexibility and elasticity.

Another purpose of the present disclosure is to provide a tactile sensor with reduced number of wires to be used to send and receive signals, and is therefore easy to manufacture and saves costs.

According to an embodiment of the present disclosure, there is provided a tactile sensor including a first substrate on which a first electrode is formed; a second substrate on which a second electrode having a polarity opposite to that of the first electrode is formed, and on which a coupling hole is formed in a position spaced apart from the second electrode so that the first electrode may be inserted into the coupling hole and coupled thereto; and a dielectric formed on top of the second substrate to cover the first electrode and the second electrode inserted into the coupling hole and coupled thereto.

Here, the first substrate may include a plurality of first plate bodies each having one said first electrode; and a plurality of first connecting bodies of which one side is connected to one of the first plate bodies, and another side is connected to another one of the first plate bodies or to the first substrate, and the second substrate may include a plurality of second plate bodies each having one said second electrode and one said coupling hole; and a plurality of second connecting bodies of which one side is connected to one of the second plate bodies, and another side is connected to another one of the second plate bodies or to another portion of the second substrate.

Here, on a portion of the second connecting body, a connecting hole may be formed to connect the coupling hole formed in the one of the second plate bodies and the coupling hole formed in the another one of the second plate bodies.

Here, the first substrate may further include a first connecting electrode that connects the first electrode formed on the one of the first plate bodies and the first electrode formed on the another one of the first plate bodies, the second substrate may further include a second connecting electrode that connects the second electrode formed on the one of the second plate bodies and the second electrode formed on the another one of the second plate bodies, and the first connecting electrode may be inserted into the connecting hole.

Here, either or both of the first connecting body and the second connecting body may be formed in a wave form of zig-zag shape.

Here, the tactile sensor may further include an insulator between the first substrate and the second substrate.

Here, a height of the first electrode inserted into the coupling hole and coupled thereto may be identical to a height of the second electrode.

According to the present disclosure, a tactile sensor having flexibility and elasticity is provided.

Further, the number of wires to be used to send and receive signals is reduced, thereby making it easier and inexpensive to manufacture the tactile sensor.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present between two elements. Like reference numerals refer to like elements throughout.

DETAILED DESCRIPTION

Hereafter, a tactile sensor according to an embodiment of the present disclosure will be explained in detail with reference to the drawings attached.

Figure 1:
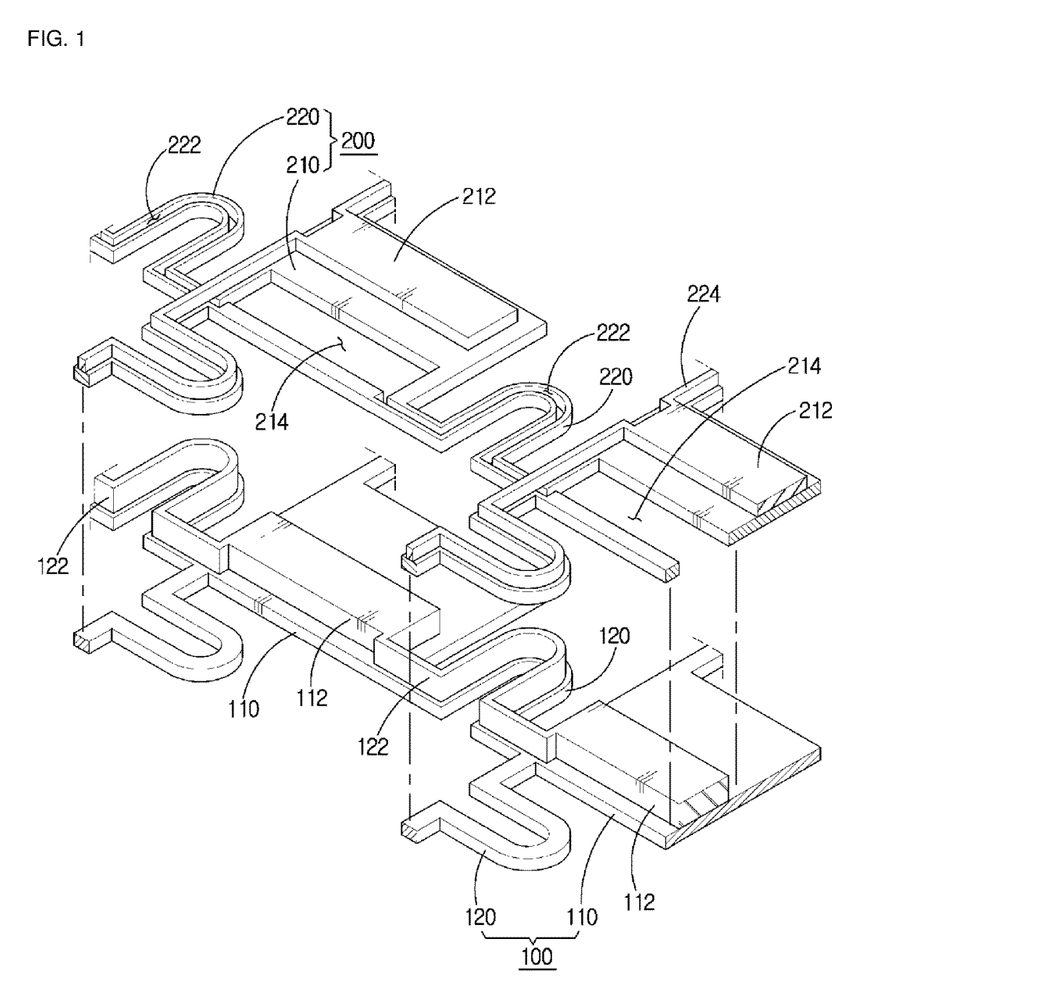
FIG. 1 is an exploded view illustrating a portion of a first substrate and a second substrate of a tactile sensor according to an embodiment of the present disclosure.
Figure 2:
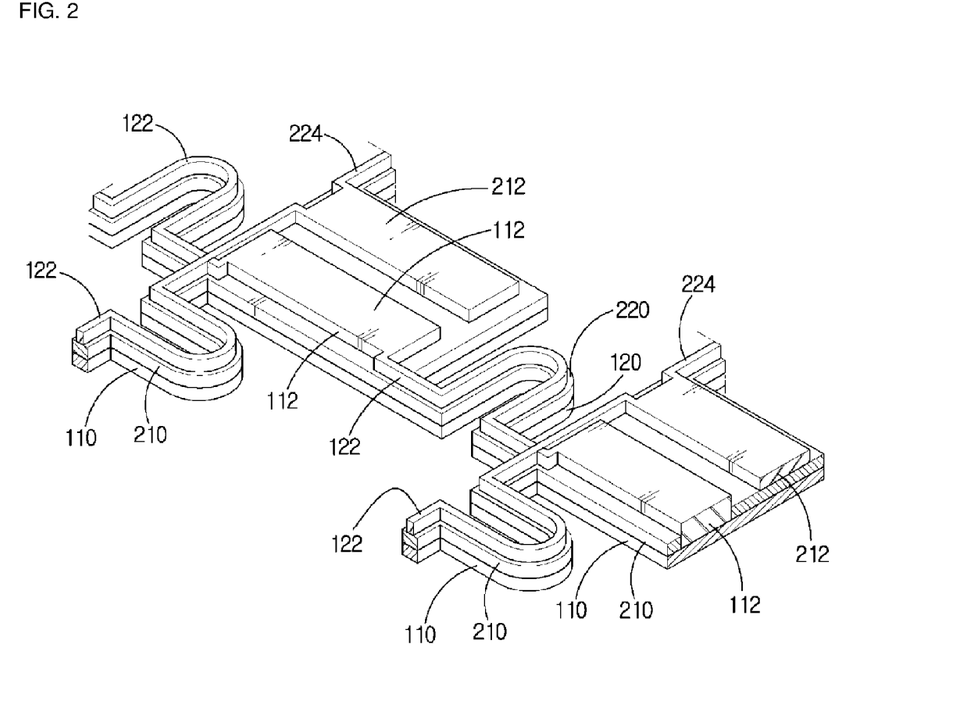
FIG. 2 is an assembled view of the portion of the first substrate and the second substrate illustrated in FIG. 1.
Figure 3:
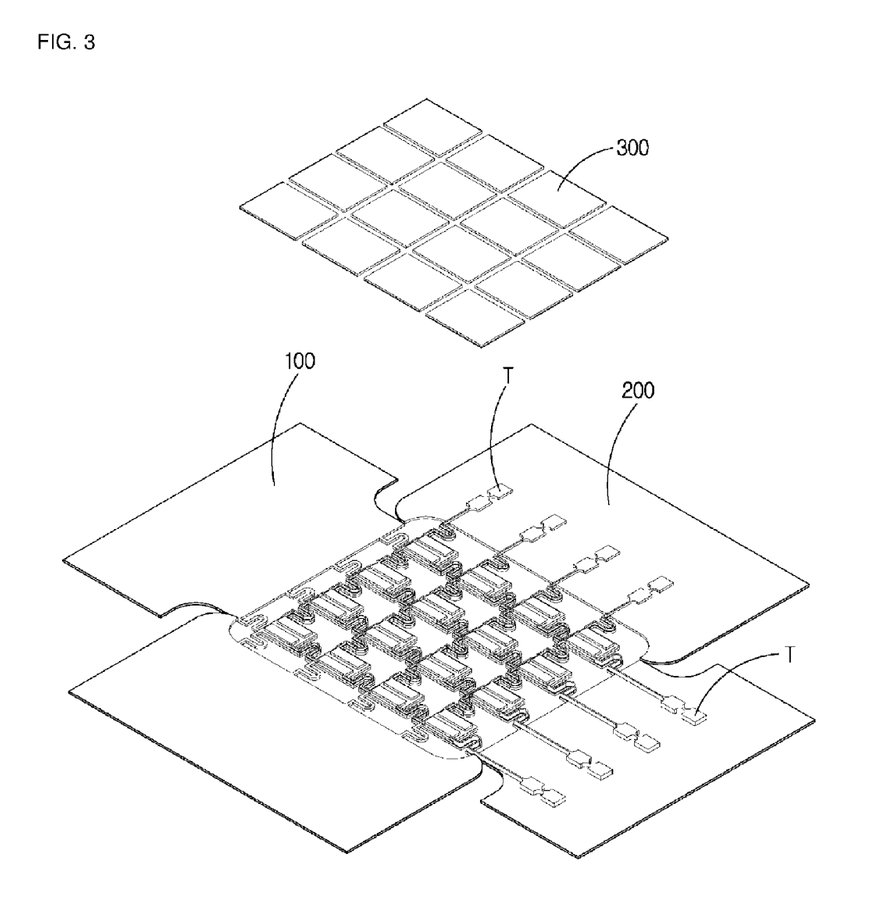
FIG. 3 is a perspective view illustrating a state of forming a dielectric on the first substrate and the second substrate coupled to each other.
Figure 4:
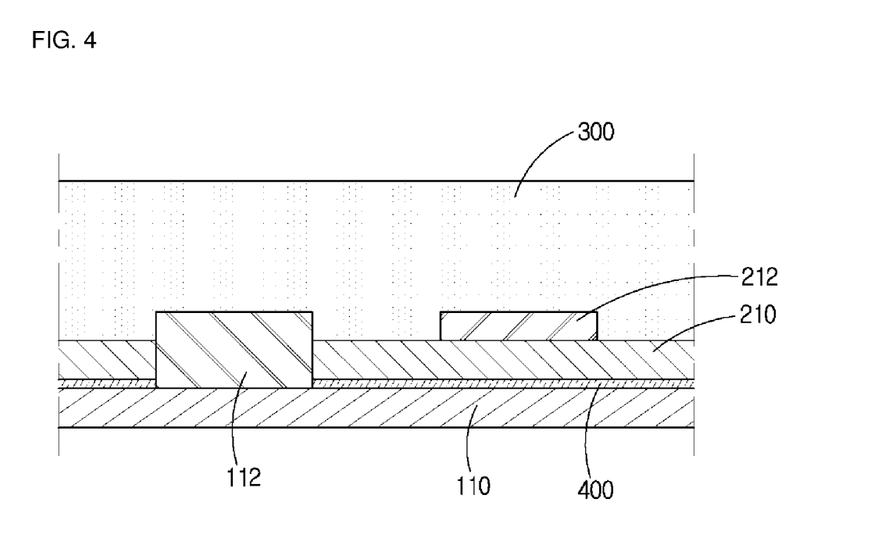
FIG. 4 is a cross-sectional view of a portion of the tactile sensor illustrated in FIG. 3.

FIG. 1 is an exploded view illustrating a portion of a first substrate and a second substrate of a tactile sensor according to an embodiment of the present disclosure, FIG. 2 is an assembled view of a portion of the first substrate and the second substrate illustrated in FIG. 1. Further, FIG. 3 is a perspective view illustrating a state of forming a dielectric on the first substrate and second substrate coupled to each other, and FIG. 4 is a cross-sectional view of a portion of the tactile sensor illustrated in FIG. 3.

Referring to FIGS. 1 to 4, a tactile sensor according to an embodiment of the present disclosure includes a first substrate 100, a second substrate 200, a dielectric 300 and an insulator 400.

The first substrate 100 is an element where a first electrode 112 is to be formed. The first substrate 100 may be a polymer film (polyimide film, polyester film) substrate or a glass substrate. The present disclosure uses a flexible printed circuit board (FPCB) using a polyimide film, that is a polymer film having excellent electrical, thermal, mechanical and physical/chemical characteristics together with flexibility. The first substrate 100 used in the present disclosure includes a plurality of first plate bodies 110 and a plurality of first connecting bodies 120. The first plate body 110 is where one said first electrode 112 is formed. One side of the first connecting body 120 may be connected to one of the first plate bodies 110, and the other side of the first connecting body 120 may be connected to another one of the first plate bodies 110, or to another portion of the first substrate 100 besides the first plate bodies 110. That is, all of the first substrate 100 may consist of the first plate bodies 110, or otherwise, only a portion of the first substrate 100 may consist of the first plate bodies 110. Here, the first connecting body 120 is formed in a wave form of zig-zag shape so that it has flexibility and elasticity such as a spring. The first electrode 112 may be made of materials such as indium tin oxide (ITO), carbon nanotube (CNT), graphene and silver nano wire, etc. Such a first electrode 112 may be configured to have a plus electrode (anode) or a minus electrode (cathode) depending on circumstances, but in the present disclosure, the first electrode 112 has a minus polarity. Further, the structure of the first electrode 112 may vary as well. That is, the first electrode 112 may have a single-layer structure or a multiple-layer structure. Meanwhile, although it is illustrated in the drawings that the first electrode 112 has a rectangular shape, there is no limitation thereto. That is, the shape of the first electrode 112 may vary, for example, a polygonal shape and semicircular shape, etc. Further, the first substrate 100 further includes a first connecting electrode 122 that connects the first electrode 112 formed on one of the first plate bodies 110 and the first electrode 112 formed in another one of the first plate bodies 110. Such a first connecting electrode 122 is formed on the first connecting body 120 that connects the first plate bodies 110 neighboring each other.

The second substrate 200 is an element where a second electrode 212 having a polarity opposite to that of the first electrode 112, that is, a plus electrode, is formed. It is also an element where a coupling hole 214 is formed in a location spaced apart from the second electrode 212 such that the first electrode 112 may be inserted into the coupling hole 214 and thus coupled to the second substrate 200. The second substrate 200 consists of a plurality of second plate bodies 210 and a plurality of second connecting bodies 220 similarly as the first substrate 100 mentioned above. The second plate body 210 is where one said second electrode 212 and one said coupling hole 214 are formed.

One side of the second connecting body 220 is connected to one of the second plate bodies 210, and another side of the second connecting body 220 is connected to another one of the second plate bodies 210 or to another portion of the second substrate 200 besides the second plate bodies 210. That is, just as the first substrate 100, all of the second substrate 200 may consist of the second plate bodies 210 only, or otherwise, only a portion of the second substrate 200 may consist of the second plate bodies 210. Further, just as the first connecting body 120, it is also desirable that the second connecting body 220 is formed in a wave form of zig-zag shape so as to have flexibility and elasticity. Here, on a portion of the second connecting body 220, a connecting hole 222 is formed according to the shape of the second connecting body 220. That is, a coupling hole 214 provided on the second substrate 200 and its neighboring coupling hole 214 that is close thereto are connected to each other by the connecting hole 222 formed on the second connecting body 220. Accordingly, the first connecting electrode 122 is configured to be inserted into the connecting hole 222 just as the first electrode 112 is inserted into the coupling hole 214 of the second substrate 200 and coupled thereto. The second substrate 200 is made of a flexible printed circuit board (FPCB) just as the first substrate 100 mentioned above, and the second electrode 212 formed on the second substrate 200 may be made of a same material as or a different material from that of the first electrode 112. For example, the first electrode 112 may be made of carbon nano tube while the second electrode 212 is made of carbon nano tube or indium tin oxide (ITO). Further, the second electrode 212 may have a single-layer structure or a multiple-layer structure, and the shape of the second electrode 212 may vary, including but not limited to, for example, a rectangular shape. Meanwhile, the second substrate 200 may further include a second connecting electrode 224 that connects the second electrode 212 formed on one of the second plate bodies 210 and the second electrode 212 formed on another one of the second plate bodies 210. Such a second connecting electrode 224 is formed in the second connecting body 220 connecting the second plate bodies 210, especially in the second connecting body 220 where the connecting hole 222 is not formed.

As aforementioned, the first electrode 112 formed on one of the first plate bodies 110 constituting the first substrate 100 is inserted through the coupling hole 214 formed in one of the second plate bodies 210 constituting the second substrate 200, thereby forming one pair of first electrode 112 and second electrode 212. That is, one of the first plate bodies 110 of the first substrate 100 and one of the second plate bodies 210 of the second substrate 200 are coupled to each other, forming a cell, that is a minimum unit having one first electrode 112 and one second electrode 212. Further, as illustrated in FIG. 3, the first electrode 112 and the second electrode 212 is connected to a terminal T provided on a portion of the first substrate 100 and the second substrate 200 where the first plate bodies 110 and the second plate bodies 210 are not formed, configured to play the role as an entrance through which current may enter and exit. This terminal T is connected to an output control (I/O control) device (not illustrated) that controls inputting/outputting through a multiplexer (not illustrated), that is a combinational circuit generally called "Mux" and configured to select one of numerous input lines and connect it to a single output line.

The dielectric 300 is an element formed on top of the second substrate 200, and configured to cover the second electrode 212 and the first electrode 112 inserted into the coupling hole 214 and coupled thereto. Here, in the present disclosure, the dielectric 300 is made of carbon micro coil (CMC), that is amorphous carbon fiber being used in various fields as an electromagnetic wave absorber, hydrogen absorber, microwave heating material, tactile proximity sensor, biological activator and the like due to its excellent electrical•chemical characteristics, and that also has excellent elasticity, thereby providing both flexibility and elasticity.

Meanwhile, the insulator 400 is further provided between the first substrate 100 and the second substrate 200. Examples of the insulator 400 that may be used herein include polymer, ceramic, rubber and the like generally used in the field.

As aforementioned, according to the present disclosure, the first electrode 112 is formed on the first substrate 100 that constitutes one layer, and on the second substrate 200 that is formed separately from the first substrate 100 to constitute another layer, the second electrode 212 having a polarity opposite to that of the first electrode 112 is formed. These are formed in a cross stripe form, whereby the number of wires needed to send and receive signals may be minimized. Therefore, it becomes easier and more inexpensive to manufacture the tactile sensor.

Hereinafter, explanation will be made on an order of manufacturing the tactile sensor according to an embodiment of the present disclosure.

FIGS. 5A to 5D are views illustrating the order of manufacturing the tactile sensor according to the embodiment of the present disclosure. Here, in FIGS. 5A to 5D, one of the first plate bodies 110 of the first substrate 100 and one of the second plate bodies 210 of the second substrate 200 are coupled to each other to form a cell, that is the minimum unit having the first electrode 112 and the second electrode 212.

Figure 5A:
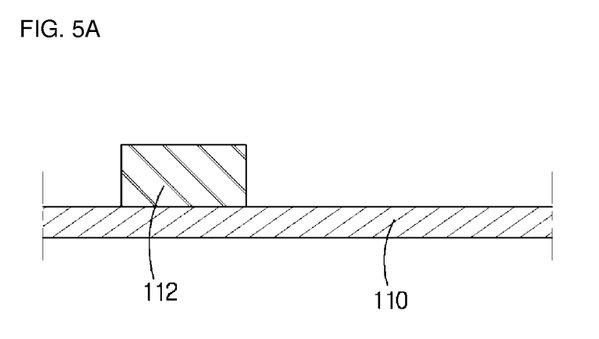
FIGS. 5A to 5D are views illustrating the manufacturing order of the tactile sensor according to an embodiment of the present disclosure.

First of all, as illustrated in FIG. 5A, the first substrate 100 is prepared. On the first substrate 100, that is, on the first plate body 110, the first electrode 112 is formed. Of course, it is possible to use a first substrate 100 where a first electrode 112 is already formed beforehand, but it is also possible to prepare the first substrate 100 where the first electrode 112 is not formed, and then form the first electrode 112 with a material such as indium tin oxide (ITO), carbon nanotube (CNT), graphene and silver nano wire, etc. Here, a sputtering method may be used to form (laminate) the first electrode 112, and it is desirable to form the first electrode 112 with carbon nanotube that has excellent adhesiveness and is inexpensive.

Figure 5B:
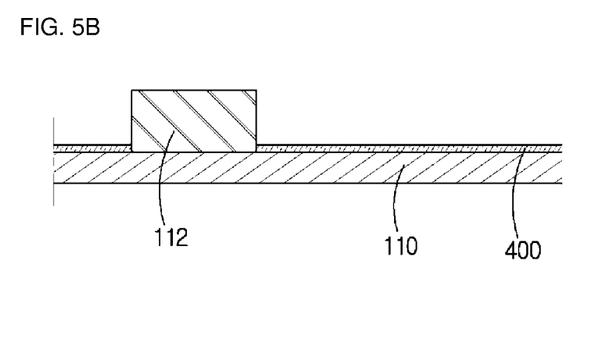

Then, as illustrated in FIG. 5B, an insulating layer is formed on top of the first substrate 100. Examples of the insulator 400 that may be used to form the insulating layer herein include polymer, ceramic, rubber and the like that are generally used in the field. Here, the insulator 400 should not cover the first electrode 112.

Figure 5C:
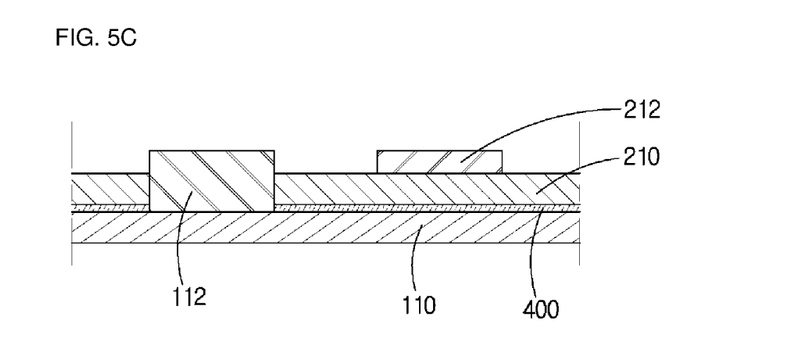

After forming the insulating layer using the insulator 400, as illustrated in FIG. 5C, the second substrate 200 is prepared, and the first electrode 112 of the first substrate 100 is inserted into the coupling hole 114 and coupled thereto. On the second substrate 200, that is, on the second plate body 210, the second electrode 212 is formed. It is possible to use a second substrate 200 where the second electrode 212 is already formed beforehand just as the first substrate 100, or otherwise, it is also possible to insert the first electrode 112 into the coupling hole 214 to couple the second substrate 200, and then form the second electrode 212. The second electrode 212 may be made of a material different from the first electrode 112, but it is desirable to form the second electrode 212 with the same material (carbon nanotube) as the first electrode 112 in order to save manufacturing costs and the like. Here, it is possible to increase the efficiency of configuration by adjusting the height of the first electrode 112 and the height of the second electrode 212 being inserted into the coupling hole 214 to be identical to each other.

Figure 5D:
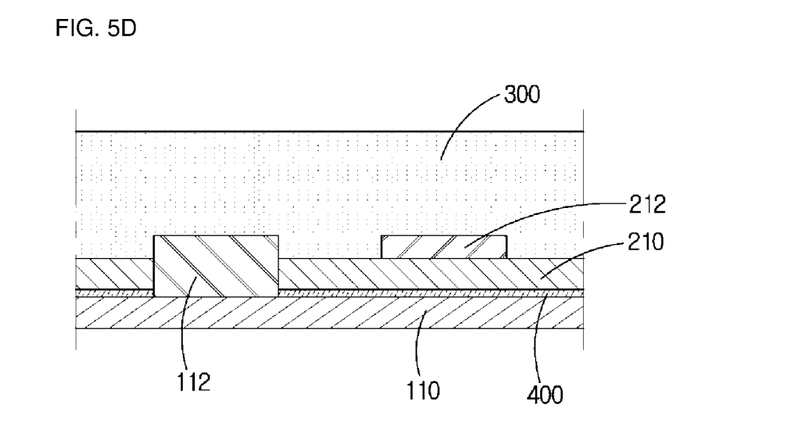

Then, as illustrated in FIG. 5D, a dielectric layer is formed on top of the second substrate 200 from which the first electrode 112 protrudes, that is, on top of the second plate body 210. In the present disclosure, carbon micro coil (CMC) is used as the dielectric 300 constituting the dielectric layer, thereby providing elasticity, and as the dielectric 300 covers the first electrode 112 and the second electrode 212, the tactile sensor according to the embodiment of the present disclosure is manufactured.

In the drawings and specification, there have been disclosed typical embodiments of the invention, and although specific terms are employed, they are used in a generic and descriptive sense only and not for purposes of limitation. It will be understood by those of ordinary skill in the art that various changes in form and details may be made therein without departing from the spirit and scope of the present invention as defined by the following claims.

REFERENCE NUMERALS

100: FIRST SUBSTRATE
110: FIRST PLATE BODY
112: FIRST ELECTRODE
120: FIRST CONNECTING BODY
122: FIRST CONNECTING ELECTRODE
200: SECOND SUBSTRATE
210: SECOND PLATE BODY
212: SECOND ELECTRODE
214: COUPLING HOLE
220: SECOND CONNECTING BODY
222: CONNECTING HOLE
224: SECOND CONNECTING ELECTRODE
300: DIELECTRIC
400: INSULATOR
T: TERMINAL

What is claimed is:
1. A tactile sensor comprising:
a first substrate on which a first electrode is formed;

a second substrate on which a second electrode having a polarity opposite to that of the first electrode is formed, and on which a coupling hole is formed in a position spaced apart from the second electrode so that the first electrode may be inserted into the coupling hole and coupled thereto; and a dielectric formed on top of the second substrate to cover the first electrode and the second electrode inserted into the coupling hole and coupled thereto.

2. The tactile sensor according to claim 1, wherein the first substrate comprises:

a plurality of first plate bodies each having one said first electrode; and a plurality of first connecting bodies of which one side is connected to one of the first plate bodies, and another side is connected to another one of the first plate bodies or to the first substrate, wherein the second substrate comprises:

a plurality of second plate bodies each having one said second electrode and one said coupling hole; and a plurality of second connecting bodies of which one side is connected to one of the second plate bodies, and another side is connected to another one of the second plate bodies or to another portion of the second substrate.

3. The tactile sensor according to claim 2, wherein on a portion of the second connecting bodies, a connecting hole is formed to connect the coupling hole formed in the one of the second plate bodies and the coupling hole formed in the another one of the second plate bodies.

4. The tactile sensor according to claim 3, wherein the first substrate further comprises a first connecting electrode that connects the first electrode formed on the one of the first plate bodies and the first electrode formed on the another one of the first plate bodies, the second substrate further comprises a second connecting electrode that connects the second electrode formed on the one of the second plate bodies and the second electrode formed on the another one of the second plate bodies, and the first connecting electrode is inserted into the connecting hole.

5. The tactile sensor according to claim 4, wherein either or both of the first connecting bodies and the second connecting body are formed in a wave form of zig-zag shape.

6. The tactile sensor according to claim 5, further comprising an insulator between the first substrate and the second substrate.

7. The tactile sensor according to claim 1, wherein a height of the first electrode inserted into the coupling hole and coupled thereto is identical to a height of the second electrode.

* * * * *